United States Patent
Tang et al.

(10) Patent No.: US 12,548,043 B2
(45) Date of Patent: *Feb. 10, 2026

(54) QUERY-PRODUCT INTERFACE FOR ECOMMERCE PLATFORM

(71) Applicant: PACVUE CORPORATION, Culver City, CA (US)

(72) Inventors: Zhaohui Tang, Bellevue, WA (US); Faru Nie, Issaquah, WA (US)

(73) Assignee: Pacvue Corporation, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,366

(22) Filed: Sep. 17, 2024

(65) Prior Publication Data

US 2025/0054020 A1    Feb. 13, 2025

Related U.S. Application Data

(63) Continuation of application No. 16/893,942, filed on Jun. 5, 2020, now Pat. No. 12,125,060.

(51) Int. Cl.
*G06Q 30/00* (2023.01)
*G06Q 30/0242* (2023.01)
*G06Q 30/0251* (2023.01)
*G06Q 30/0273* (2023.01)
*G05B 19/418* (2006.01)
*G06F 3/0482* (2013.01)

(52) U.S. Cl.
CPC ..... *G06Q 30/0242* (2013.01); *G06Q 30/0256* (2013.01); *G06Q 30/0273* (2013.01); *G06F 3/0482* (2013.01)

(58) Field of Classification Search
CPC ........... G06Q 30/0242; G06Q 30/0256; G06Q 30/0273; G06F 3/0482; G06F 3/0481
See application file for complete search history.

(56) References Cited

U.S. PATENT DOCUMENTS 10,684,738 B1 * 6/2020 Sicora .................. G06F 3/0485
10,878,043 B2 * 12/2020 Voleti ................... G06F 16/951

OTHER PUBLICATIONS

"Exploiting Rich Telecom Data for Increased Monetization of Telecom Application Stores". IEEE. 2012. (Year: 2012).*

* cited by examiner

*Primary Examiner* — Maria V Vanderhorst
(74) *Attorney, Agent, or Firm* — P. G. Scott Born; FisherBroyles, LLP

(57) ABSTRACT

A computer-implemented process includes receiving with an eCommerce platform from a user over a network a first product-search keyword, generating to a display of the user a graphical user interface (GUI) including a first selectable icon showing the first keyword, a first selectable image of a first product and a first connector between the first icon and first image, the first connector indicating that the first product was previously purchased using the eCommerce platform in response to the platform receiving the first keyword, and in response to user selection of the icon, generating to the GUI a set of performance indicators characterizing an advertising campaign associated with at least one of the first keyword and first product within the eCommerce platform.

18 Claims, 3 Drawing Sheets

QUERY-PRODUCT INTERFACE FOR ECOMMERCE PLATFORM

PRIORITY CLAIM

This application is a continuation of U.S. patent application Ser. No. 16/893,942 filed Jun. 5, 2020, which application claims priority to U.S. Provisional Patent Application Ser. No. 62/857,713 filed Jun. 5, 2019, the contents of which are hereby incorporated by reference in their entirety as if fully set forth herein.

BACKGROUND

More effective ways of evaluating user buying trends and the effectiveness of advertising campaigns associated with eCommerce platforms, which are systems of hardware/software technologies that serve as the foundation for product-selling services, are needed.

DETAILED DESCRIPTION

Figure 1:
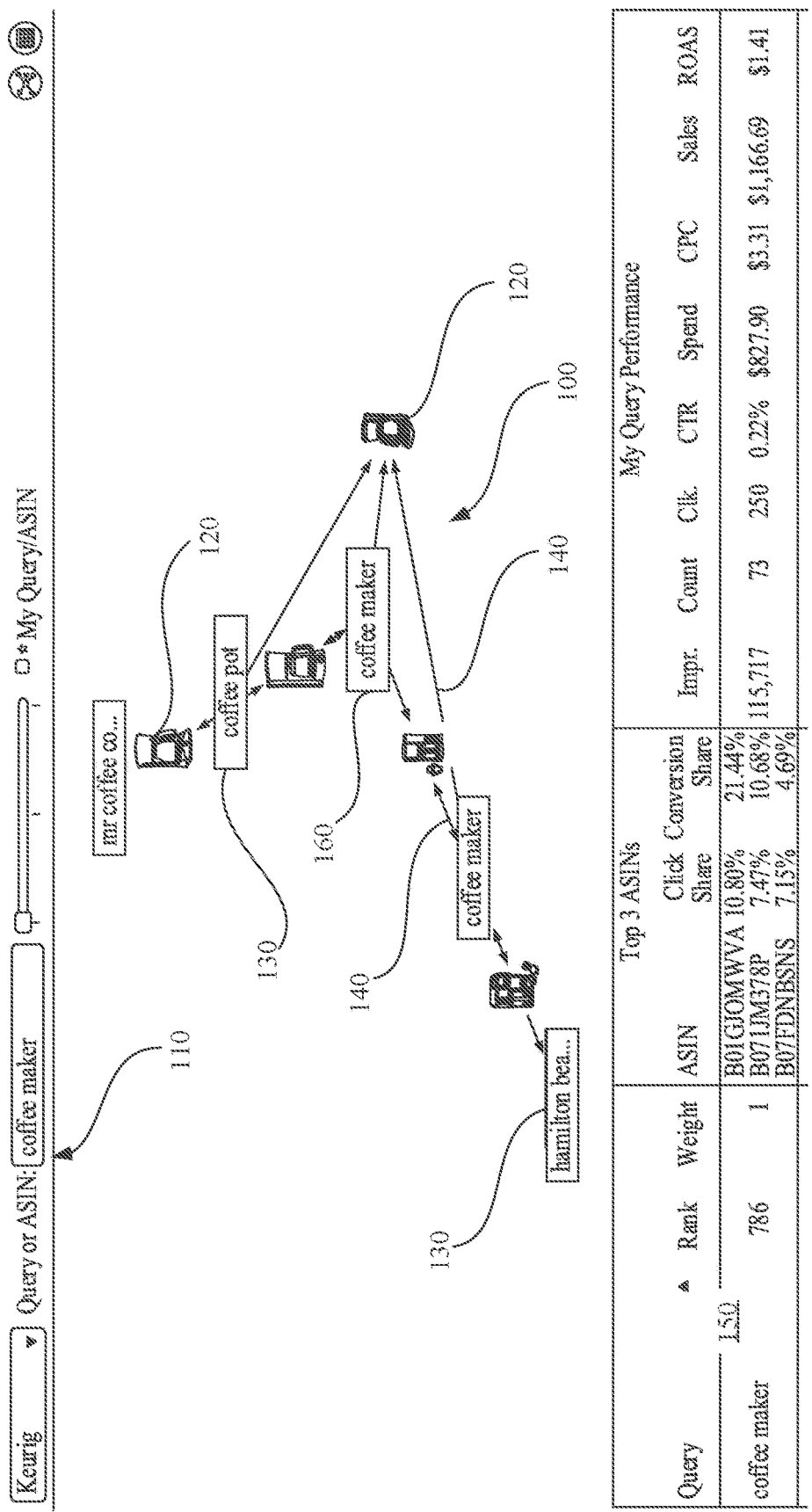
FIG. 1 illustrates a Query view of a Product-Query Graph according to one or more embodiments of the invention.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the present invention may comprise or utilize a special-purpose or general-purpose computer including computer hardware, such as, for example, one or more processors and system memory, as discussed in greater detail below. Embodiments within the scope of the present invention also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special-purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. In some embodiments, computer-executable instructions are executed on a general-purpose computer to turn the general-purpose computer into a special-purpose computer implementing elements of the invention. The computer executable instructions may be, for example, binaries, intermediate format instructions such as assembly language, or even source code. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 2:
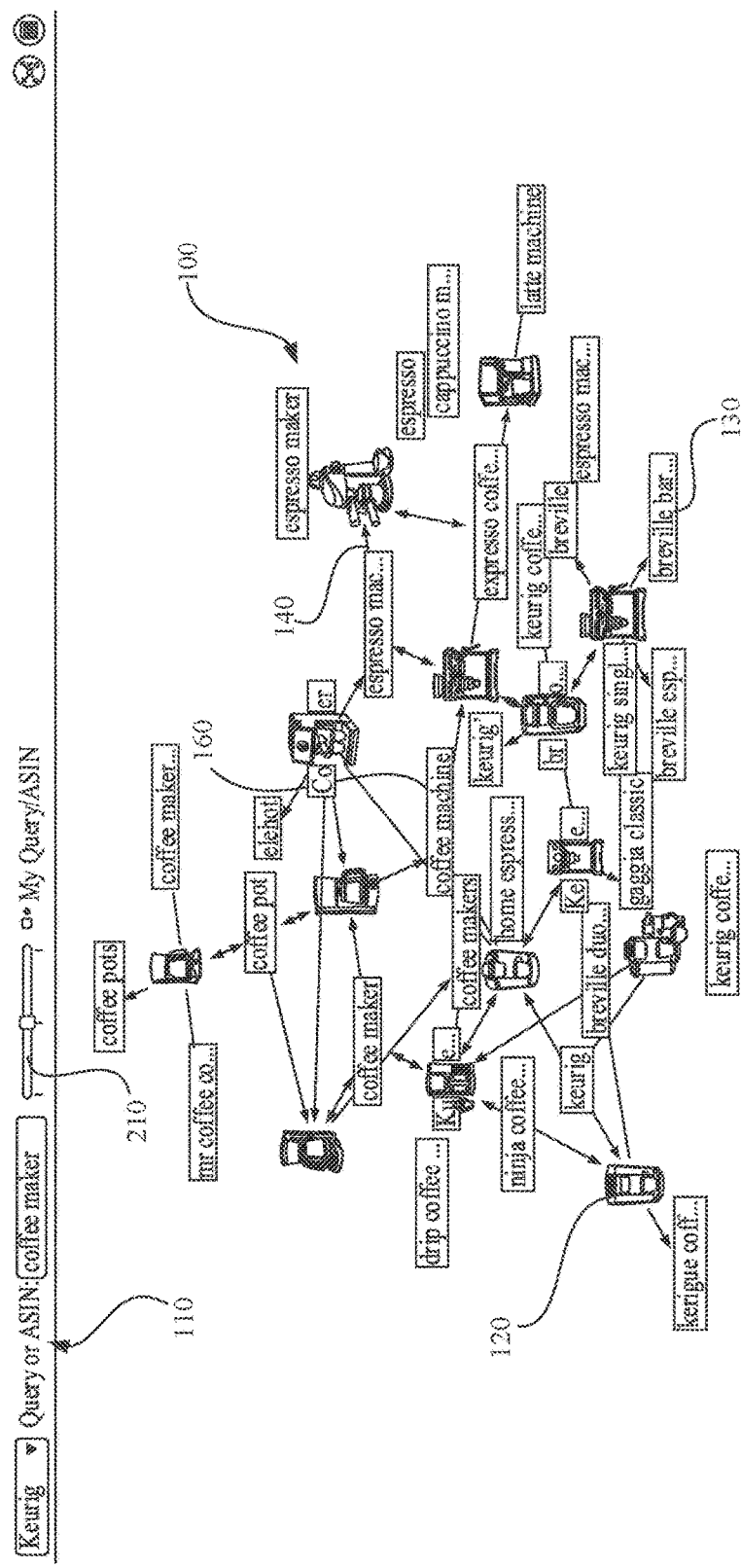
FIG. 2 illustrates a Multi-layer of Product-Query graph according to one or more embodiments of the invention.

An embodiment provides a graphical user interface (GUI) that includes an interactive graph that presents one or more products and user-query relationships associated with an online eCommerce platform such as Amazon®, Walmart® and Target®. In the case of Amazon, a product is uniquely identified by an ASIN (Amazon Standard Identification Number) as is best illustrated in FIGS. 1-2.

Figure 3:
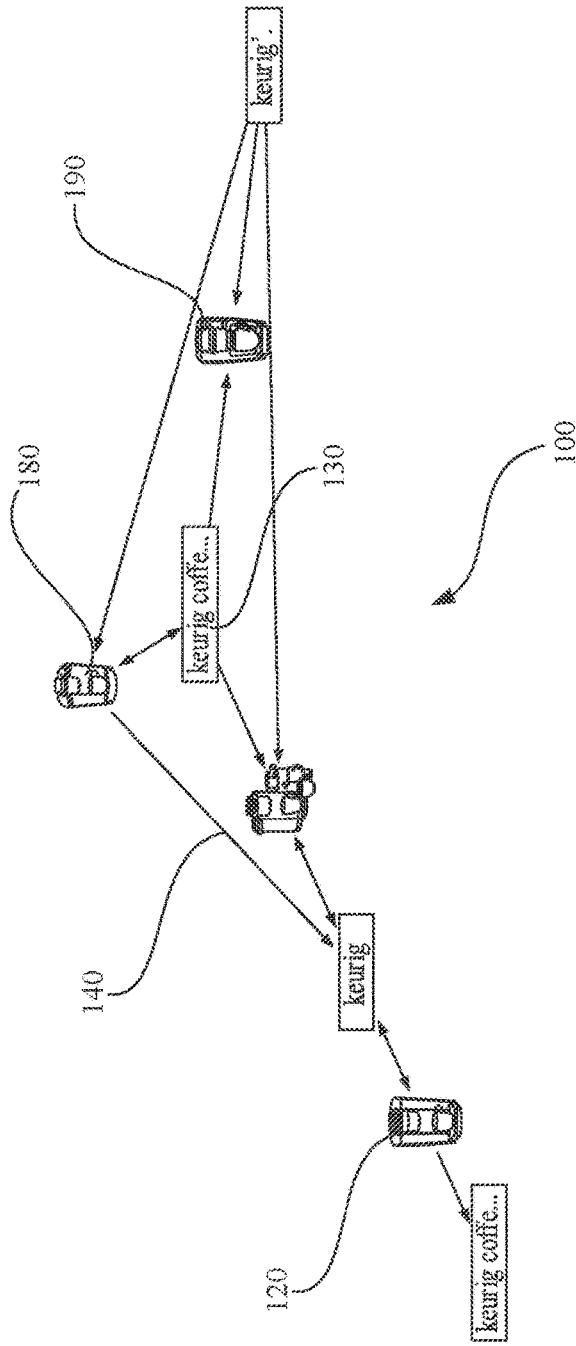
FIG. 3 illustrates a Product view of the Product-Query Graph according to one or more embodiments of the invention.

The GUI is interactive. A user can input a search expression/keyword/query (as is illustrated in FIGS. 1 and 2) or a product identifier (e.g., ASIN as is illustrated in FIG. 3) into an alphanumeric field 110. A chart 100, such as that illustrated in FIGS. 1-3, is then displayed (in the case of FIGS. 1-2, the search expression/keyword/query input to field 110 is "coffee maker"). The chart 100 includes image nodes 120 that respectively represent a unique product that matches or is otherwise categorically relevant, as may be determined by one or more administrators of an embodiment, to the input query. The chart 100 further includes icons such as alphanumeric text boxes 130. Each text box 130 represents a user query previously entered into and stored by the online eCommerce platform and categorically relevant to the input query, as also may be determined by one or more administrators of an embodiment. Connectors, such as arrows 140, represent a relationship between a product represented by a node 120 and a query represented by text box 130. Each arrow 140 has a direction, representing a predictive relationship. An arrow 140 can be either unidirectional or bidirectional.

An arrow 140 pointing from a text box 130 to an image node 120 indicates that the query associated with the text box is most likely to lead to a purchase action of the product associated with the image node, as compared to many other user queries in the system. These purchase likelihoods as represented by the arrows 140 may be based, for example, on stored correlation data indicative of the frequency with which a particular product represented by an image node 120 was purchased as a result of a particular search query presented in a corresponding text box 130. As such, an arrow 140 pointing from a text box 130 to an image node 120 indicates that there is a predetermined historical level of correlative purchase "traffic" that could mean an increased likelihood of the purchase of the product associated with the image node resulting from the query associated with the text box.

An embodiment of the GUI includes a data table 150 of statistics below the chart 100. If, as illustrated in FIGS. 1 and 2, a text box 130 is selected, the data table 150 shows query statistics associated with the selected text box. If, as illustrated in FIG. 3, an image node 120 is selected, the data table 150 may show statistics related to the product associated with the selected image node.

Each query text box 130 and image node 120 can be selected. If one or more query text boxes 130 are selected, a query view of statistics associated with the selected query text box(es) 160, 170 is presented in the data table 150 as shown in FIGS. 1 and 2. If one or more product image nodes 120 are selected, a product view of statistics associated with the selected image nodes 180, 190 is presented in the data table 150 as shown in FIG. 3.

As illustrated in FIG. 1, when a query text box 130 is selected, such as selected box 160, the data table 150 may display the statistics associated with one or more products (represented in FIG. 1 by ASINs in table 150) that were once purchased using the eCommerce platform as a direct result of the submission of that particular query to field 110 as indicated by arrows 140 pointing to image nodes 120 associated with such products. If the query is a bidding keyword of an advertising campaign (i.e., the product seller included by the product seller as a query in Amazon search advertising), data table 150 displays advertising performance indicators such as impressions, CPC (cost per click), clicks, as well.

FIG. 2 is an example of a multi-layer display of a product-query graph. A user can display more relational layers (i.e., product nodes 120, query nodes 130 and arrows 140) on the graph by moving the sliding bar 210 at the top of the interface to the right.

As is best illustrated in FIG. 3, when a product image node 120 is selected, such as selected image nodes 180, 190, the data table 150 displays statistics characterizing queries made to the eCommerce platform that yielded display of and/or purchase of the product(s) associated with the selected image nodes as indicated by arrows 140 pointing to nodes 130 associated with such queries. If these queries are part of the advertising campaign, data table 150 displays the advertising performance indicators such as impressions, CPC, Clicks, etc.

While the preferred embodiment of the disclosure has been illustrated and described, as noted above, many changes can be made without departing from the spirit and scope of the disclosure. Accordingly, the scope of the described systems and techniques is not limited by the disclosure of the preferred embodiment. Instead, the described systems and techniques should be determined entirely by reference to the claims.

What is claimed is:

1. A computer-implemented process, comprising the steps of:
   receiving with an executable eCommerce platform from a user over a network a first product-search keyword;
   generating to a display of the user a graphical user interface (GUI) including a first selectable icon showing the first keyword, a first selectable representation of a first product and a first electronically generated connector between the first icon and first the first connector indicating that the first product was previously purchased using the eCommerce platform after the platform received the first keyword; and
   in response to user selection of the icon, generating to the GUI a set of performance indicators characterizing an advertising campaign within the eCommerce platform, the advertising campaign associated with at least one of the first keyword and first product.

2. The process of claim 1, wherein the GUI includes an alphanumeric field into which the first keyword is entered.

3. The process of claim 1, further comprising generating to the GUI a second selectable icon showing a second product-search keyword previously received with the eCommerce platform, the second keyword being categorically relevant to the first keyword.

4. The process of claim 3, wherein the first and second icons are simultaneously displayed in the GUI.

5. The process of claim 1, further comprising generating to the GUI a second selectable representation of a second product and a second connector between the first icon and second representation, the second connector indicating that the second product was previously purchased using the eCommerce platform after the platform received the first keyword.

6. The process of claim 1, wherein the performance indicators include at least one of impressions, cost-per-click and number of clicks.

7. At least one computer-readable medium on which are stored instructions that, when executed by one or more processing devices, enable the one or more processing devices to perform a method, the method comprising the steps of:
receiving with an executable Commerce platform from a user over a network a first product-search keyword;
generating to a display of the user a graphical user interface (GUI) including a first selectable icon showing the first keyword, a selectable representation of a first product and a first electronically generated connector between the first icon and first representation, the first connector indicating that the first product was previously purchased using the eCommerce platform after the platform received the first keyword; and
in response to user selection of the icon, generating to the GUI a set of performance indicators characterizing an advertising campaign within the eCommerce platform, the advertising campaign associated with at least one of the first keyword and first product.

8. The method of claim 7, wherein the GUI includes an alphanumeric field into which the first keyword is entered.

9. The method of claim 7, further comprising generating to the GUI a second selectable icon showing a second product-search keyword previously received with the eCommerce platform, the second keyword being categorically relevant to the first keyword.

10. The method of claim 9, wherein the first and second icons are simultaneously displayed in the GUI.

11. The method of claim 7, further comprising generating to the GUI a second selectable representation of a second product and a second connector between the first icon and second representation, the second connector indicating that the second product was previously purchased using the eCommerce platform after the platform received the first keyword.

12. The method of claim 7, wherein the performance indicators include at least one of impressions, cost-per-click and number of clicks.

13. At least one computer-readable medium on which are stored instructions that, when executed by one or more processing devices, enable the one or more processing devices to perform a method, the method comprising the steps of:
receiving with an executable eCommerce platform from a user over a network a first unique product identifier;
generating to a display of the user a graphical user interface (GUI) including a first selectable icon showing a first product-search keyword, a first selectable representation of a first product corresponding to the product identifier and a first electronically generated connector between the first icon and first representation, the first connector indicating that the first product was previously purchased using the eCommerce platform after the platform received at least one of the first keyword and the first unique product identifier; and
in response to user selection of the representation, generating to the GUI a set of performance indicators characterizing an advertising campaign within the eCommerce platform, the advertising campaign associated with at least one of the first keyword and first product.

14. The method of claim 13, wherein the GUI includes an alphanumeric field into which the first product identifier is entered.

15. The process of claim 13, further comprising generating to the GUI a second selectable icon showing a second product-search keyword previously received with the eCommerce platform, the second keyword being categorically relevant to the first keyword.

16. The process of claim 15, wherein the first and second icons are simultaneously displayed in the GUI.

17. The process of claim 13, further comprising generating to the GUI a second selectable representation of a second product and a second connector between the first icon and second representation, the second connector indicating that the second product was previously purchased using the eCommerce platform after the platform received the first product identifier.

18. The process of claim 13, wherein the performance indicators include at least one of impressions, cost-per-click and number of clicks.

* * * * *